(12) United States Patent
Abe

(10) Patent No.: US 6,684,029 B2
(45) Date of Patent: Jan. 27, 2004

(54) FINDER OPTICAL SYSTEM AND CAMERA HAVING FINDER OPTICAL SYSTEM

(75) Inventor: Tetsuya Abe, Sapporo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/101,055

(22) Filed: Mar. 20, 2002

(65) Prior Publication Data
US 2002/0136552 A1 Sep. 26, 2002

(30) Foreign Application Priority Data

Mar. 21, 2001 (JP) ........................................ 2001-081622
Mar. 21, 2001 (JP) ........................................ 2001-081623

(51) Int. Cl.[7] ........................... G03B 13/08; G03B 17/00
(52) U.S. Cl. ........................ 396/386; 396/385; 396/373; 396/384
(58) Field of Search ................................. 396/373, 382, 396/384–386

(56) References Cited

U.S. PATENT DOCUMENTS

| 5,235,184 A | 8/1993 | Paulson | |
|---|---|---|---|
| 5,537,184 A | 7/1996 | Hasushita et al. | |
| 5,640,632 A | * 6/1997 | Koyama et al. | 396/382 |
| 5,752,107 A | 5/1998 | Hasushita et al. | |
| 6,052,541 A | * 4/2000 | Nishimura | 396/382 |

FOREIGN PATENT DOCUMENTS

JP 9-133868 5/1997

* cited by examiner

Primary Examiner—Russell Adams
Assistant Examiner—Michael Dalakis
(74) Attorney, Agent, or Firm—Greenblum & Bernstein, P.L.C.

(57) ABSTRACT

A camera including a photographing optical system and a finder optical system, includes an objective optical system and an ocular optical system, the optical axes thereof being parallel with each other; a reflection surface which reflects a light bundle in the vertical direction of the camera; a reflection surface which reflects the light bundle in the horizontal direction of the camera toward an light-emitting optical axis of the ocular optical system; and a reflection surface located on the light-emitting optical axis to make a connecting optical axis coincident with the light-emitting optical axis of the ocular optical system. The connecting optical axis is inclined with respect to the horizontal direction of the camera so that the optical axes of the objective optical system and the ocular optical system are close to each other with respect to the vertical direction of the camera.

13 Claims, 4 Drawing Sheets

Fig.5
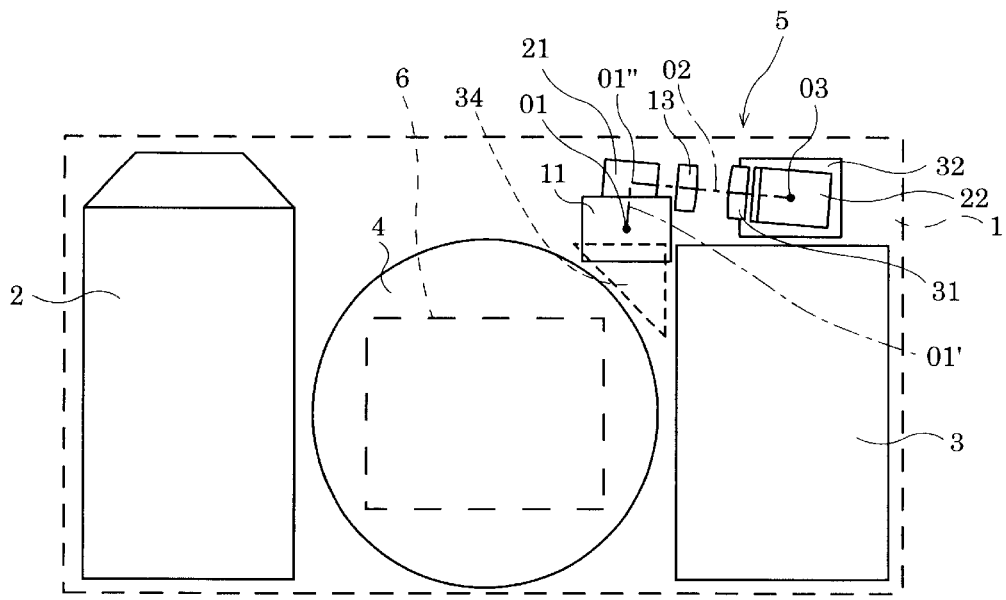
Fig.6
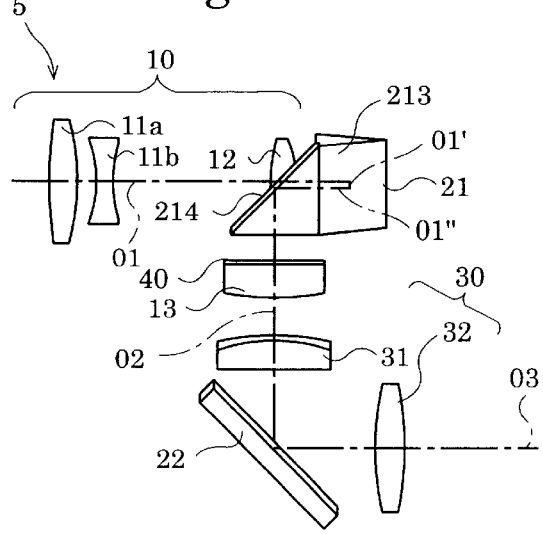
Fig.7
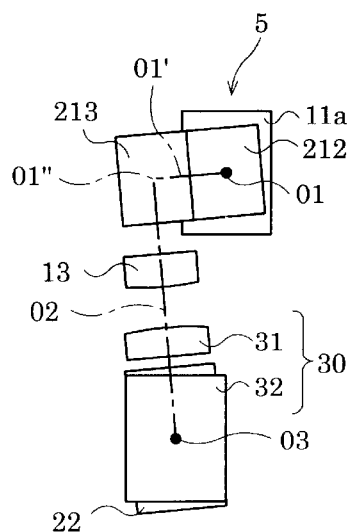
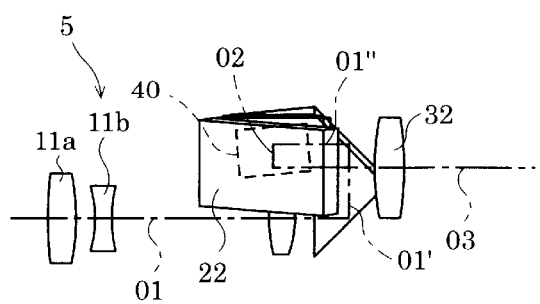
Fig.8

FINDER OPTICAL SYSTEM AND CAMERA HAVING FINDER OPTICAL SYSTEM

BACKGROUND OF THE INVENTION

1. Field of the Invention

The present invention relates to a finder optical system which is independent of a photographing optical system, for example, in a lens shutter camera, and a camera having a finder optical system which is independent of a photographing optical system.

2. Description of the Related Art

A real-image view finder optical system, provided independently from a photographing optical system, has been widely applied to silver-halide-film cameras and digital cameras. The real-image view finder includes a positive powered objective optical system, an image erecting optical system, and a positive powered eyepiece optical system, arranged in that order from the object side, wherein an inverted image formed by the objective optical system is inverted in the vertical and horizontal directions by the image erecting optical system so that an erect image can be viewed through the eyepiece optical system. Such a real-image erecting optical system is, in general, constructed with a Porro prism having a combination of four reflection surfaces.

The Porro prism which has a simple structure, in which an image is inverted by a combination of upper and lower reflection surfaces and right and left reflection surfaces, can be easily machined, and the optical path length of the entire image erecting optical system can be reduced. Therefore, the entire structure of the finder optical system can be simplified.

However, in the Porro prism, the image must be inverted by 180 degrees without overlapping the upper and lower optical paths and the right and left optical paths, and hence, the optical axis of light incident upon the Porro prism and the optical axis of light emitted therefrom is deviated (stepped) in the vertical and horizontal directions by an amount greater than a diameter of the light bundle. The deviation (difference) in the vertical and horizontal directions is always set along the rectangular field of view of the eyepiece optical system in a conventional finder optical system. Consequently, in a finder optical system in which the Porro prism is used for the image erecting optical system, the size in the vertical direction is large, and accordingly, if the finder optical system is incorporated, for example, in a lens shutter camera, the height of the camera is increased.

Moreover, if the Porro prism is used for the image erecting optical system in a real-image type finder optical system, in general, at least the reflection surfaces of the Porro prism are partly located between the image formed by the objective optical system and the eyepiece optical system. In this arrangement in which the image erecting optical system is arranged between the image formed by the objective optical system and the eyepiece optical system, the optical path length between the image and the eyepiece is increased, and hence, it is necessary to increase the focal length of the eyepiece optical system. However, if the focal length of the eyepiece optical system is increased, the finder magnification is reduced. Consequently, the apparent field of view is reduced, thus resulting in difficulty in viewing the finder image or a deteriorated quality of the finder image.

The size of the last surface of the eyepiece optical system (lens diameter) is substantially determined by the apparent field of view and the eye relief. Therefore, as the eye relief is lengthened to provide easy viewing, the eyepiece optical system is made large. In particular, the size of the finder optical system (camera) in the vertical direction is increased.

SUMMARY OF THE INVENTION

The present invention provides a finder optical system in which the height of a camera in which the finder optical system is incorporated (length of the minor side of a rectangular field of view of the finder) can be reduced.

The present invention also provides a finder optical system in which the finder magnification and the apparent field of view can be increased and the eye relief can be easily lengthened while reducing the height of a camera in which the finder optical system is incorporated.

The present invention provides a camera having a real-image type finder optical system in which the height of the camera can be made small.

The present invention provides a camera having a finder optical system in which the finder magnification and the apparent field of view can be increased and the eye relief can be easily lengthened while reducing the height of the camera.

The present invention has been completed based on the basic concept that the size of an ocular optical system of a finder optical system is substantially determined by the apparent field of view and the eye relief, whereas there is little restriction to the size of the objective optical system. Hence, the height of an image erecting optical system in the vertical direction can be reduced by arranging one or more of the reflection surfaces constituting a Porro prism that are adapted to invert an image in the vertical direction on the objective optical system side; and the deviation between the optical axis of the objective optical system and the optical axis of the ocular optical system can be reduced by rotating the entire finder optical system about the optical axis of light incident upon the Porro prism without inclining the field frame.

Also, according to the basic concept of the present invention, the camera can be miniaturized by utilizing a substantially triangular space (in which other components are accommodated) between a film winding spool compartment and a photographing lens as viewed from front.

For example, in an embodiment, a finder optical system is provided, including an objective optical system having a positive power; an ocular optical system having a positive power, wherein a light-emitting optical axis of the ocular optical system is parallel with an incident optical axis of the objective optical system, the ocular optical system having a rectangular field of view; a minor direction reflection surface which reflects a light bundle, incident upon the objective optical system, in a substantially minor direction of the rectangular field of view; a first major direction reflection surface which reflects the light bundle, reflected by the minor direction reflection surface, in a substantially major direction, of the rectangular field of view, toward the light-emitting optical axis of the ocular optical system; and a second major direction reflection surface located on the light-emitting optical axis of the ocular optical system to make a connecting optical axis, of the light bundle reflected by the first major direction reflection surface and incident on the second major direction reflection surface, coincident with the light-emitting optical axis of the ocular optical system. The connecting optical axis is inclined with respect to the major direction of the rectangular field of view in a direction in which the incident optical axis of the objective optical system and the light-emitting optical axis of the ocular optical system come close to each other with respect to the minor direction of the rectangular field of view.

It is desirable for the finder optical system to further include a prism provided behind the objective optical system, the prism being provided with the minor direction reflection surface and the first major direction reflection surface.

Three reflection surfaces including the minor direction reflection surface, which reflects the light bundle incident upon the objective optical system in the minor direction of the rectangular field of view, and the major direction reflection surface, which reflects the light reflected by the minor direction reflection surface in the major direction toward the light-emitting optical axis of the ocular optical system, can be located in an optical light path extending from the objective optical system to an image forming position at which an image is formed by the objective optical system.

A field frame which defines the rectangular field of view of the ocular optical system can be provided in an optical light path between the first major direction reflection surface and the second major direction reflection surface.

In another embodiment, a camera is provided, including a photographing optical system, having a substantially rectangular photographic field frame, and a finder optical system which defines a substantially rectangular field of view corresponding to the photographic field frame, the finder optical system including an objective optical system having positive power; an ocular optical system having positive power, wherein a light-emitting optical axis of the ocular optical system is parallel with an incident optical axis of the objective optical system; a vertical direction reflection surface provided on the objective optical system side which reflects a light bundle, incident upon the objective optical system, in the vertical direction of the camera; a first horizontal direction reflection surface which reflects the light bundle, reflected by the vertical direction reflection surface, in the horizontal direction of the camera toward the light-emitting optical axis of the ocular optical system; and a second horizontal direction reflection surface located on the light-emitting optical axis of the ocular optical system to make a connecting optical axis, of the light bundle reflected by the first horizontal direction reflection surface and incident on the second horizontal direction reflection surface, coincident with the light-emitting optical axis of the ocular optical system. The connecting optical axis is inclined with respect to the horizontal direction of the camera in a direction in which the incident optical axis of the objective optical system and the light-emitting optical axis of the ocular optical system come close to each other with respect to the vertical direction of the camera.

The camera can be a silver-halide-film camera which forms an image on silver halide film via the photographing optical system; wherein a camera body of the silver-halide-film camera includes a film cartridge compartment and a film winding spool compartment, a photographing lens having a substantially circular shape with respect to a front elevation and located between the film cartridge compartment and the film winding spool compartment, and a finder optical system provided above the film winding spool compartment. The incident optical axis is located above a substantially triangular space between the film winding spool compartment and the photographing lens, with respect to the front elevation of the camera.

The camera can be a digital camera which forms an image on a solid-state image sensor via the photographing optical system.

The finder optical system can further include a prism provided behind the objective optical system, the prism being provided with the vertical direction reflection surface and the first horizontal direction reflection surface.

Three reflection surfaces including the vertical direction reflection surface, which reflects the light bundle incident upon the objective optical system in the vertical direction of the camera, and the first horizontal direction reflection surface, which reflects the light bundle reflected by the vertical direction reflection surface in the horizontal direction toward the light-emitting optical axis of the ocular optical system, can be located in a light path extending from the objective optical system to an image forming position at which an image is formed by the objective optical system.

It is desirable for a lens of the objective optical system and a lens of the ocular optical system which are externally exposed on the camera body, to each include a rectangular shape defining minor sides and major sides with respect to the vertical direction and the horizontal direction of the camera, respectively.

In another embodiment, a camera is provided, including a photographing optical system having a rectangular photographic field frame having major and minor sides, and a real-image finder optical system for viewing the photographic field frame; the real-image finder optical system including an objective optical system having a positive power; an ocular optical system having a positive power; and an erecting optical system having four reflection surfaces. At least two optical axes, out of three optical axes which are connected to each other via the four reflection surfaces, are inclined with respect to the major and minor sides of the rectangular photographic field frame.

A vertical distance from a point of intersection between a reflection surface provided closest to the object side of the real-image finder optical system and an incident optical axis of the objective optical system, and a point of intersection between a reflection surface closest to an outermost eyepiece lens of the ocular optical system and a light-emitting optical axis of the ocular optical system, can be shorter compared to a case where the at least two optical axes are not inclined with respect to the major and minor sides.

It is desirable for the incident optical axis which is incident on the reflection surface provided closest to the object side of the real-image finder optical system, and the light-emitting optical axis which emits from the reflection surface closest to an outermost eyepiece lens of the ocular optical system, to each extend parallel to the optical axis of the photographing optical system.

The present disclosure relates to subject matter contained in Japanese Patent Application Nos.2001-81622 (filed on Mar. 21, 2001) and 2001-81623 (filed on Mar. 21, 2001) which are expressly incorporated herein by reference in its entirety.

BRIEF DESCRIPTION OF THE DRAWINGS

The invention will be discussed below with reference to the accompanying drawings, in which:

FIG. 5 is a front elevational view of a camera having a finder optical system according to a second embodiment of the present invention;

FIG. 6 is a plan view of the finder optical system shown in FIG. 5;

FIG. 7 is a rear elevational view of FIG. 6;

FIG. 8 is a side elevational view of FIG. 6;

DESCRIPTION OF THE PREFERRED EMBODIMENTS

Figure 1:
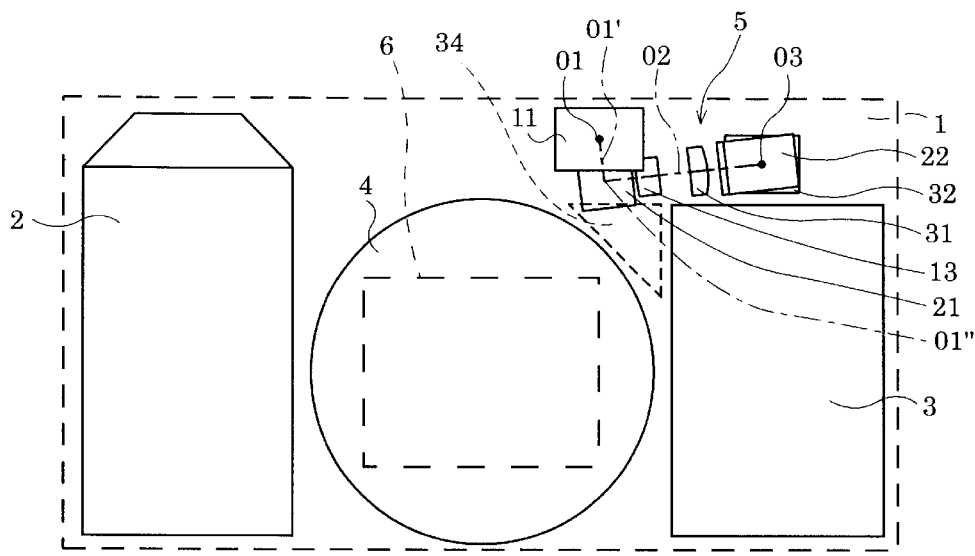
FIG. 1 is a front elevational view of a camera having a finder optical system according to a first embodiment of the present invention.
Figure 2:
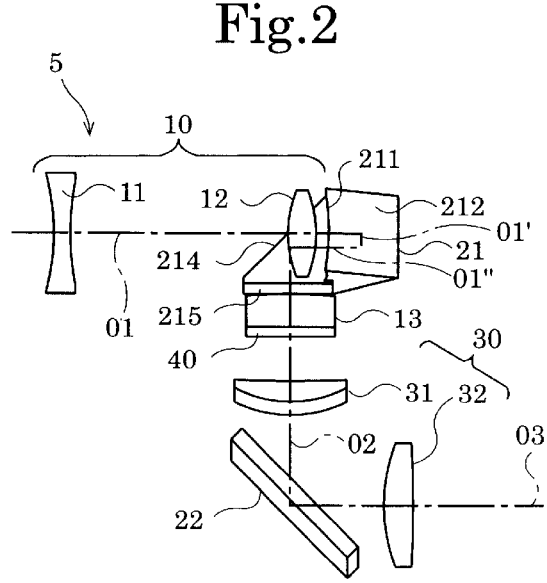
FIG. 2 is a plan view of the finder optical system shown in FIG. 1.

FIGS. 1 through 4 show a first embodiment of a finder optical system, according to the present invention, and a camera having such a finder optical system. The present invention can be applied to a silver-halide-film camera and to a digital camera. FIG. 1 shows, as an embodiment, a silver-halide-film lens shutter camera having a film cartridge compartment 2 and a film winding spool compartment 3 on the left and right sides of a camera body 1, respectively, as viewed from the front. A photographing lens 4 having a substantially circular shape in a front elevation is located between the film cartridge compartment 2 and the film winding spool compartment 3. A finder optical system (real-image finder optical system) 5 is located above the film winding spool compartment 3. The photographing lens (photographing optical system) 4 includes a rectangular photographic field frame 6 having major and minor sides in the horizontal (lateral) and vertical (upward/downward) directions, respectively. The finder optical system 5 has a rectangular field of view (field frame 40) which corresponds to the rectangular photographic field frame 6. The size of the photographic field frame 6 is determined by the photographic aperture size in the case of a silver-halide-film camera, and is determined by the size of the imaging plane of a solid-state image sensor (CCD) in the case of a digital camera.

The finder optical system 5 includes an objective optical system 10, a prism 21, a plano-convex lens 13, a positive meniscus lens 31, a plane mirror 22, and an eyepiece 32, in that order from the object side. The objective optical system 10 has positive power as a whole and includes a negative lens 11 and a positive lens 12 in that order from the object side. The negative lens 11 and the positive lens 12 are located on an incident optical axis O1 of the objective optical system 10.

The prism 21 located behind the objective optical system 10 is provided with an incidence surface 211, a first reflection surface 212, a second reflection surface 213, a third reflection surface 214, and a light-emitting surface 215, in that order from the object side. The incident surface 211 is formed as concave surface in the present embodiment. The first reflection surface 212 defines a first minor direction reflection surface (first vertical (upward/downward) direction reflection surface) which is adapted to reflect a light bundle, traveling along the incident optical axis O1, in a minor direction of a rectangular field of view. The second reflection surface 213 defines a second minor direction reflection surface (second vertical (upward/downward) direction reflection surface) which is adapted to reflect the light bundle, reflected by the first minor direction reflection surface, in a direction so that the light bundle returns toward the object side. The third reflection surface 214 defines a first major direction reflection surface (first horizontal (lateral) direction reflection surface) which is adapted to reflect the light bundle, which has been reflected by the first and second minor direction reflection surfaces (first and second reflection surfaces 212 and 213), toward the plane mirror 22 to define a connecting optical axis O2. The plane mirror 22 defines a second major direction reflection surface (second horizontal (lateral) direction reflection surface) which is adapted to make the connecting optical axis O2 coincident with the optical axis O3 (i.e., coincident with the optical axis of the light emitted from the eyepiece 32) of an ocular optical system 30.

The plano-convex lens 13 and the positive meniscus lens 31 are located on the connecting optical axis O2, and the ocular optical system 30 is defined by the eyepiece 32 and the positive meniscus lens 31. The image forming position, at which an image is formed by the objective optical system 10, is coincident with the light-emitting surface (i.e., at the same position as the light-emitting surface) of the plano-convex lens 13. The plano-convex lens 13 is provided with a field frame 40 which determines the rectangular field of view. The inverted image formed by the objective optical system 10 is inverted in the vertical and horizontal directions by an image erecting optical system including four reflection surfaces consisting of the reflection surfaces 212, 213 and 214, and the plane mirror 22, so that an erected image thereof be viewed through the eyepiece 32.

The reflection surfaces 212 and 213 of the prism 21 intersect at right angles. A light bundle which is incident on the incident surface 211 of the prism 21 is reflected twice via the reflection surfaces 212 and 213, so that the inverted image formed by the objective optical system 10 is inverted in the vertical direction. Likewise, the reflection surface 214 of the prism 21 and the plane mirror 22 (i.e., planes extended from the surfaces of the reflection surface 214 and the plane mirror 22) intersect at right angles. The light bundle is reflected twice via the reflection surface 214 and the plane mirror 22, so that the image formed by the objective optical system 10 is inverted in the horizontal direction. The image erecting optical system has the same image inverting function as a Porro prism.

Figure 3:
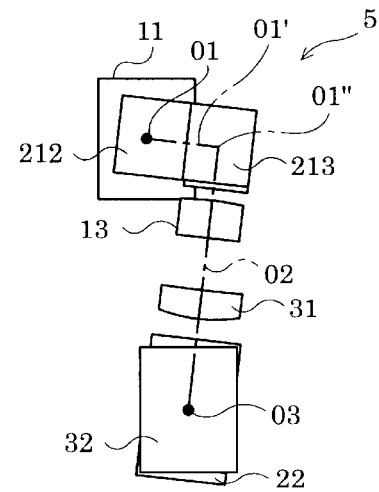
FIG. 3 is a rear elevational view of FIG. 2.
Figure 4:
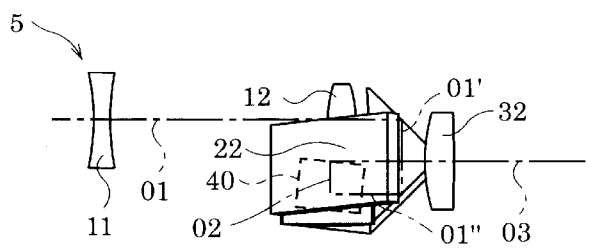
FIG. 4 is a side elevational view of FIG. 2.
Figure 9:
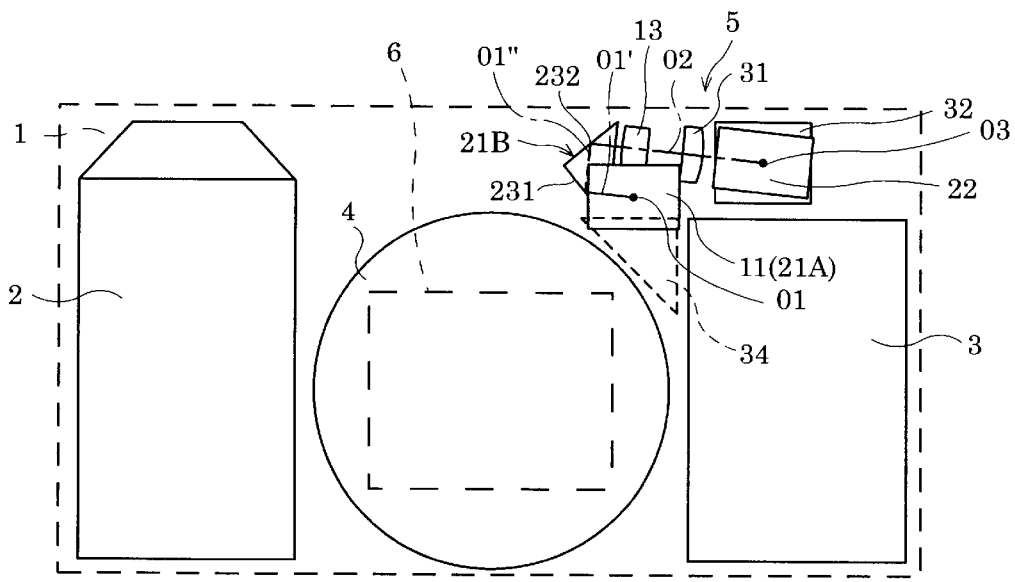
FIG. 9 is a front elevational view of a camera having a finder optical system according to a third embodiment of the present invention.
Figure 10:
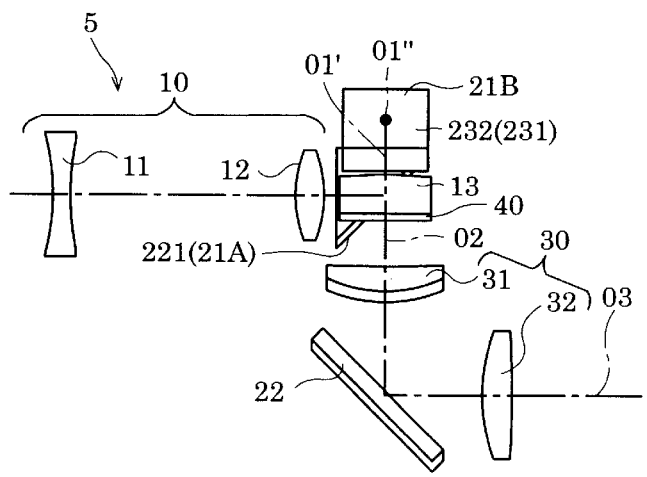
FIG. 10 is a plan view of the finder optical system shown in FIG. 9.
Figure 11:
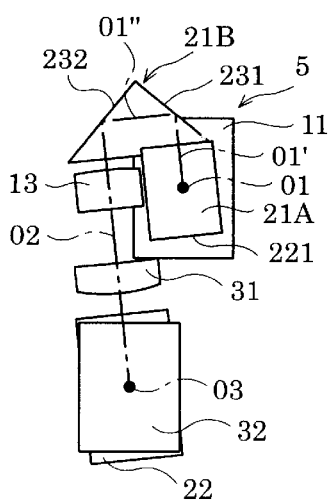
FIG. 11 is a rear elevational view of FIG. 9.

The significant feature of this embodiment resides in that the connecting optical axis O2 is inclined, i.e., not parallel, with respect to the major direction of the rectangular field of view, in a direction so that the incident optical axis O1 of the objective optical system 10 and the light-emitting optical axis O3 of the ocular optical system 30 come close to each other in the minor direction of a rectangular field of view based on the rectangular field of view defined by the field frame 40 (see FIG. 3). As shown in FIG. 3, the negative lens 11 of the objective optical system 10 and the eyepiece 32 of the ocular optical system 30 are shown in the shape of rectangle corresponding to the rectangular field of view. The field frame 40 located on the connecting optical axis O2 is rotated about the light-emitting optical axis O3 in addition to the inclination of the connecting optical axis O2 as mentioned above (i.e., the rotation of the optical elements of the finder optical system, other than the positive lens 12 and the eyepiece 32, about the incident optical axis O1, with respect to the rectangular negative lens 11 of the objective optical system 10), so that the apparent field of view is correctly rectangular, i.e., is not inclined. The direction of rotation of the field frame 40 is determined depending on the structure of the image erecting optical system or the direction of rotation of the entire the finder optical system. In the arrangement shown in FIGS. 1 through 4, the field frame 40 is rotated in the clockwise direction as viewed from the left side as shown in FIG. 4.

Note that, strictly speaking, as a result of the inclination of the connecting optical axis O2 as discussed above, the first reflection surface 212 and the second reflection surface 213 do not exactly reflect the light bundle in the minor direction, and the third reflection surface 214 and the plane mirror 22 do not exactly reflect the light bundle in the major direction, respectively, with respect to the rectangular field of view of the ocular optical system 30. Namely, the first and second reflection surfaces 212 and 213 reflect the light bundle in a "substantially minor direction", i.e., in a direction slightly deviated from an exact minor direction extending parallel to the minor sides of the rectangular field of view. Likewise, the third reflection surface 214 and the plane mirror 22 reflect the light bundle in a "substantially major direction", i.e., in a direction slightly deviated from an exact major direction extending parallel to the major sides of the rectangular field of view.

In this embodiment, the incident optical axis O1 is located higher than the light-emitting optical axis O3, and the connecting optical axis O2 is inclined downwardly with respect to the horizontal direction from the light-emitting optical axis O3 of the ocular optical system 30 toward an approximate triangular space 34. With this arrangement, it is possible to reduce the distance between the incident optical axis O1 and the light-emitting optical axis O3 with respect to the vertical direction of the camera. The negative lens 11 of the objective optical system 10 and the eyepiece 32 of the ocular optical system 30 which are both externally exposed on the camera body, are in the form of a rectangle defined by minor sides and major sides accurately extending in the vertical direction and the horizontal direction of the camera, respectively.

Furthermore, in the case of the present invention being applied to a silver-halide-film camera, in a front elevation of the camera, the incident optical axis O1 of the objective optical system 10 is located above the approximate triangular space 34 (see FIG. 1) defined between the film winding spool compartment 3 and the photographing lens 4. The light-emitting optical axis O3 of the ocular optical system 30 is located above the film winding spool compartment 3. Consequently, the approximate triangular space 34 defined between the film winding spool compartment 3 and the photographing lens 4 can be effectively utilized. According to this construction, the camera can be made small (short) in the upward/downward direction. On the other hand, in the case of the present invention being applied to a digital camera, although the film winding spool compartment 3 does not exist, according to the above-described structure of the finder optical system 5, the camera can likewise be made small (short) in the upward/downward direction.

With respect to the finder optical system 5 itself, since the arrangement in which the connecting optical axis O2 connecting the incident optical axis O1 of the objective optical system 10 and the light-emitting optical axis O3 of the ocular optical system 30 is inclined with respect to the major direction of the rectangular field of view, the incident optical axis O1 and the light-emitting optical axis O3 are close to each other in the minor direction of the rectangular field of view, so that the finder optical system can be made short (small) in the upward/downward direction. Consequently, if such a finder optical system is incorporated in a camera, the camera can be made small.

In addition, in the illustrated embodiment, the prism 21 having first, second and third reflection surfaces 212, 213 and 214 is located in a light path closer to the object side than the image forming position of the objective optical system 10. Since dispersion of the light bundle is relatively small in the light path closer to the objective optical system than the image forming position, it is possible to make the finder optical system smaller than a conventional finder optical system in which the Porro prism is located in a position (in which the diameter of the light bundle is increased to obtain an appropriate size of apparent field of view or an appropriate length of eye relief) closer to the eyepiece than the image forming position. Consequently, the size of the entire finder optical system in the vertical direction can be made relatively small. The prism 21 is located closer to the object side than the image forming position of the objective optical system 10 and, hence, the prism can be considered as a part of the objective optical system 10. Furthermore, the plane mirror 22 is located closest to the eyepiece 32 than the image forming position of the objective optical system 10 and, hence, the plane mirror 22 can be considered as a part of the ocular optical system 30.

In this embodiment, the only reflection surface included in the optical path from the image forming position of the objective optical system 10 to the eyepiece 32 is the plane mirror 22, and accordingly, it is possible to reduce the optical path length thereof in comparison to the optical path necessary for providing the reflection surfaces of the Porro prism 21. Consequently, the focal length of the eyepiece 32 can be reduced, thus resulting in a large finder magnification and a larger apparent field of view.

If the finder optical system is incorporated in a camera, since the difference in height between the incident optical axis and the light-emitting optical axis of the finder optical system is reduced, it is possible to sufficiently increase the lens diameter of the ocular optical system even if the size of the finder optical system in the vertical direction is reduced. Thus, an appropriate length of eye relief can be obtained.

In the above-described first embodiment, out of the reflection surfaces 212, 213 and 214, and the plane mirror 22, of the image erecting optical system, the first and second reflection surfaces 212 and 213 define an optical axis O1', the second and third reflection surfaces 213 and 214 define an optical axis O1", and the third reflection surface 214 and the plane mirror 22 define the connecting optical axis O2. And out of these three optical axes, the optical axis O1' and the connecting optical axis O2 are inclined (i.e., not parallel) with respect to the major and minor sides of the rectangular photographic field frame 6. Accordingly, the vertical distance from a point of intersection between the first reflection surface 212, provided closest to the object side of the finder optical system 5, and the incident optical axis O1 of the objective optical system 10, and a point of intersection between the plane mirror 22, provided closest to the eyepiece 32, and the light-emitting optical axis O3 of the ocular optical system 30, is shorter than in a case where the optical axis O1' and the connecting optical axis O2 are respectively parallel to the minor and major sides of the rectangular photographic field frame 6 (see FIGS. 13 through 16), which contributes to a small (short) camera in the upward/downward direction. The incident optical axis O1 of the objective optical system 10 and the light-emitting optical axis O3, which emits from the plane mirror 22 which is closest to the eyepiece of the ocular optical system 30, respectively extend parallel to the optical axis of the photographing optical system.

FIGS. 5 through 8 show a second embodiment of a camera having a finder optical system according to the present invention. The second embodiment is different from the first embodiment only in the following aspects, namely, the objective optical system 10 includes a positive first lens 11a, a negative second lens 11b, and a positive third lens 12; the positional relationship between the incident optical axis O1 and the light-emitting optical axis O3 of the finder optical system in the vertical direction is the opposite to that of the first embodiment (i.e., the incident optical axis O1 is located in a position higher than the light-emitting optical axis O3) and the connecting optical axis O2 is inclined downwardly toward the light-emitting optical axis O3 of the ocular optical system 30; and the direction of the rotation of the field frame 40 is the opposite to that of the first embodiment.

In the above-described second embodiment, similar to the first embodiment, out of the reflection surfaces 212, 213 and 214, and the plane mirror 22, of the image erecting optical system, the first and second reflection surfaces 212 and 213 define the optical axis O1', the second and third reflection surfaces 213 and 214 define the optical axis O1", and the third reflection surface 214 and the plane mirror 22 define the connecting optical axis O2. And out of these three optical axes, the optical axis O1' and the connecting optical axis O2 are inclined (i.e., not parallel) with respect to the major and minor sides of the rectangular photographic field frame 6. Accordingly, the vertical distance from a point of intersection between the first reflection surface 212, provided closest to the object side of the finder optical system 5, and the incident optical axis O1 of the objective optical system 10, and a point of intersection between the plane mirror 22, provided closest to the eyepiece 32, and the light-emitting optical axis O3 of the ocular optical system 30, is shorter than in a case where the optical axis O1' and the connecting optical axis O2 are respectively parallel to the minor and major sides of the rectangular photographic field frame 6 (see FIGS. 13 through 16), which contributes to a small (short) camera in the upward/downward direction. The incident optical axis O1 of the objective optical system 10 and the light-emitting optical axis O3, which emits from the plane mirror 22 which is closest to the eyepiece of the ocular optical system 30, respectively extend parallel to the optical axis of the photographing optical system.

FIGS. 9 through 12 show a third embodiment of camera having a finder optical system according to the present invention. In the third embodiment, the order of the reflection surfaces of the prism located on an extension of the incident optical axis O1 of the objective optical system is different with respect to the first and second embodiments. Namely, the incident optical axis O1 is bent in a direction away from the ocular optical system 30 by a reflection surface 221 of a first rectangular prism 21A, is bent in the minor direction of the rectangular field of view by a first reflection surface 231 of a second rectangular prism 21B, and is bent in the direction toward the ocular optical system 30 by a second reflection surface 232. In the third embodiment, the first reflection surface 231 of the second rectangular prism 21B is equivalent to a vertical (upward/downward) direction reflection surface positioned on the objective optical system side, and the second reflection surface 232 is equivalent to a horizontal (lateral) direction reflection surface. The positions of the incident optical axis O1 and the light-emitting optical axis O3 of the finder optical system 5 with respect to the upward/downward direction, and the direction of rotation of the field frame 40 are the same as the second embodiment.

In the above-described third embodiment, out of the reflection surfaces 221, 231 and 232, and the plane mirror 22, of the image erecting optical system, the reflection surfaces 221 and (first reflection surface) 231 define the optical axis O1', the first and second reflection surfaces 231 and 232 define the optical axis O1", and the second reflection surface 232 and the plane mirror 22 define the connecting optical axis O2. And all of these three optical axes are inclined (i.e., not parallel) with respect to the major and minor sides of the rectangular photographic field frame 6. Accordingly, the vertical distance from a point of intersection between the reflection surface 221, provided closest to the object side of the finder optical system 5, and the incident optical axis O1 of the objective optical system 10, and a point of intersection between the plane mirror 22, provided closest to the eyepiece 32, and the light-emitting optical axis O3 of the ocular optical system 30, is shorter than in a case where the optical axis O1' and the connecting optical axis O2 were to be parallel to the major side and the optical axis O1" were to be parallel to the minor side of the rectangular photographic field frame 6 (see FIGS. 13 through 16), which contributes to a small (short) camera in the upward/downward direction. The incident optical axis O1 of the objective optical system 10 and the light-emitting optical axis O3, which emits from the plane mirror 22 which is closest to the eyepiece of the ocular optical system 30, respectively extend parallel to the optical axis of the photographing optical system.

Figure 12:
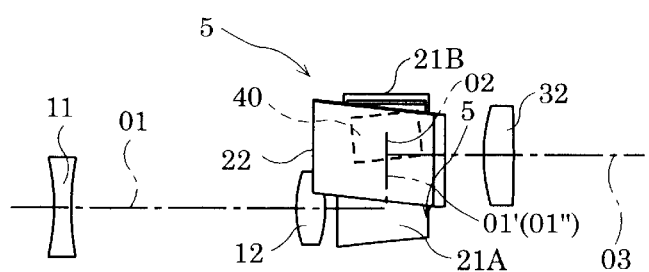
FIG. 12 is a side elevational view of FIG. 9.
Figure 13:
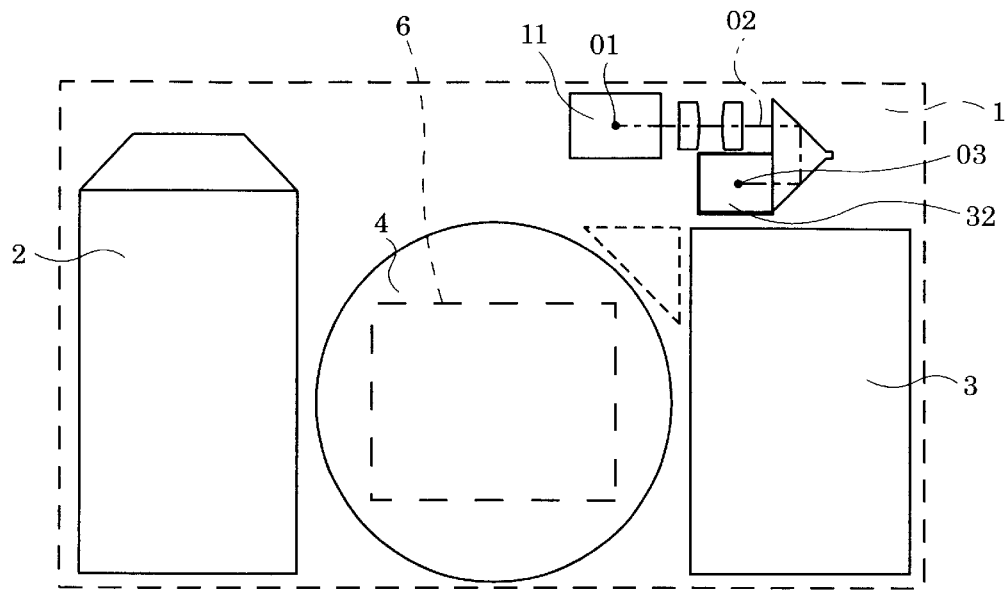
FIG. 13 is a front elevational view of a camera having a known finder optical system.
Figure 14:
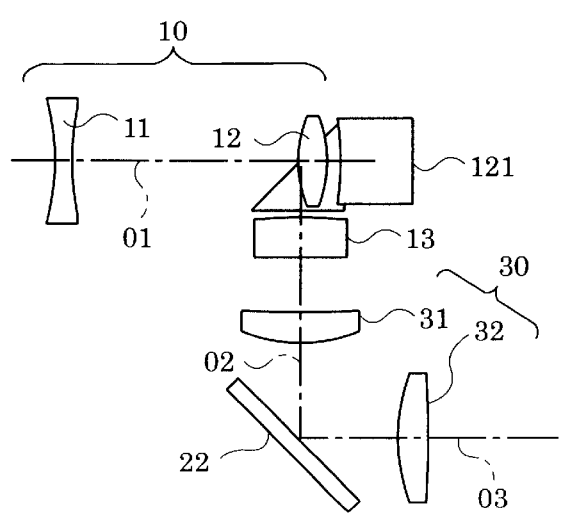
FIG. 14 is a plan view of a known finder optical system shown in FIG. 13.
Figure 15:
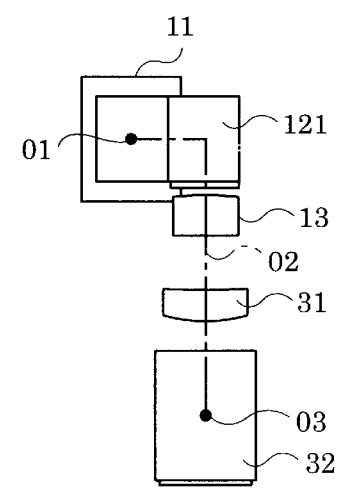
FIG. 15 is a rear elevational view of FIG. 13.
Figure 16:
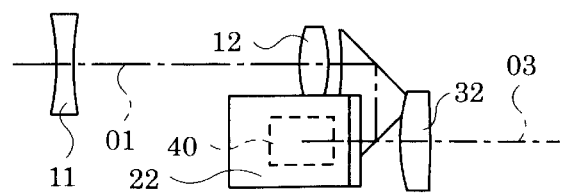
FIG. 16 is a side elevational view of FIG. 13.

FIGS. 13 through 16 show a finder optical system 5 and a camera having a finder optical system, according to the prior art, for comparison with the present invention. In the prior art, the optical elements are identical to those of the finder optical system shown in FIGS. 1 through 4, however, the connecting optical axis O2 is parallel with the horizontal direction of the camera, i.e., parallel with the major direction of the rectangular field of view (i.e., perpendicular to the minor direction). In this arrangement, the height difference between the incident optical axis O1 of the prism 121 and the light-emitting optical axis O3, in the minor direction of the rectangular field of view (i.e., the vertical direction of the camera), is to the same as the height difference between the connecting optical axis O2 and the light-emitting optical axis O3. Accordingly, the size of the camera in the height direction in FIG. 12 is undesirably greater than that in FIG. 1 or FIG. 5.

As can be understood from the above discussion, a finder optical system having a further miniaturized size, particularly in the minor direction of the rectangular field of view, can be achieved. Moreover, a high quality finder image can be viewed at a large magnification and in a large apparent field of view. Furthermore, a finder optical system which provides a long eye relief which permits a viewer to easily view an image can be attained.

According to the present invention, a camera whose size in the height direction is reduced can be attained, wherein a high quality finder image can be viewed at a large finder magnification and in a large apparent field of view, and an eye relief can be lengthened so that a viewer can easily view an image.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A finder optical system comprising:

an objective optical system having a positive power;

an ocular optical system having a positive power, wherein a light-emitting optical axis of said ocular optical system is parallel with an incident optical axis of said objective optical system, said ocular optical system having a rectangular field of view;

a minor direction reflection surface which reflects a light bundle, incident upon said objective optical system, in a substantially minor direction of said rectangular field of view;

a first major direction reflection surface which reflects the light bundle, reflected by the minor direction reflection surface, in a substantially major direction, of said rectangular field of view, toward said light-emitting optical axis of said ocular optical system; and a second major direction reflection surface located on said light-emitting optical axis of the ocular optical system to make a connecting optical axis, of the light bundle reflected by said first major direction reflection surface and incident on said second major direction reflection surface, coincident with said light-emitting optical axis of said ocular optical system;

wherein said connecting optical axis is inclined with respect to the major direction of the rectangular field of view in a direction in which the incident optical axis of the objective optical system and the light-emitting optical axis of the ocular optical system are close to each other with respect to the minor direction of the rectangular field of view.

2. The finder optical system according to claim 1, further comprising a prism provided behind the objective optical system, said prism being provided with said minor direction reflection surface and said first major direction reflection surface.

3. The finder optical system according to claim 1, wherein three reflection surfaces including the minor direction reflection surface, which reflects the light bundle incident upon the objective optical system in the minor direction of the rectangular field of view, and the major direction reflection surface, which reflects the light reflected by the minor direction reflection surface in the major direction toward the light-emitting optical axis of the ocular optical system, are located in an optical light path extending from the objective optical system to an image forming position at which an image is formed by the objective optical system.

4. The finder optical system according to claim 1, wherein a field frame which defines the rectangular field of view of the ocular optical system is provided in an optical light path between the first major direction reflection surface and the second major direction reflection surface.

5. A camera including a photographing optical system, having a substantially rectangular photographic field frame, and a finder optical system which defines a substantially rectangular field of view corresponding to said photographic field frame, said finder optical system comprising:

an objective optical system having positive power;

an ocular optical system having positive power, wherein a light-emitting optical axis of said ocular optical system is parallel with an incident optical axis of the objective optical system;

a vertical direction reflection surface provided on the objective optical system side which reflects a light bundle, incident upon the objective optical system, in the vertical direction of the camera;

a first horizontal direction reflection surface which reflects the light bundle, reflected by the vertical direction reflection surface, in the horizontal direction of the camera toward said light-emitting optical axis of said ocular optical system; and a second horizontal direction reflection surface located on said light-emitting optical axis of the ocular optical system to make a connecting optical axis, of the light bundle reflected by said first horizontal direction reflection surface and incident on said second horizontal direction reflection surface, coincident with said light-emitting optical axis of said ocular optical system;

wherein said connecting optical axis is inclined with respect to the horizontal direction of the camera in a direction in which the incident optical axis of the objective optical system and the light-emitting optical axis of the ocular optical system are close to each other with respect to the vertical direction of the camera.

6. The camera according to claim 5, wherein said camera comprises a silver-halide-film camera which forms an image on silver halide film via said photographing optical system;

wherein a camera body of said silver-halide-film camera includes a film cartridge compartment and a film winding spool compartment, a photographing lens having a substantially circular shape with respect to a front elevation and located between said film cartridge compartment and said film winding spool compartment, and a finder optical system provided above the film winding spool compartment; and wherein said incident optical axis is located above a substantially triangular space between said film winding spool compartment and said photographing lens, with respect to said front elevation of the camera.

7. The camera according to claim 5, wherein said camera comprises a digital camera which forms an image on a solid-state image sensor via said photographing optical system.

8. The camera according to claim 5, further comprising a prism provided behind said objective optical system, said prism being provided with said vertical direction reflection surface and said first horizontal direction reflection surface.

9. The camera according to claim 5, wherein three reflection surfaces including said vertical direction reflection surface, which reflects the light bundle incident upon the objective optical system in the vertical direction of the camera, and said first horizontal direction reflection surface, which reflects the light bundle reflected by said vertical direction reflection surface in the horizontal direction toward said light-emitting optical axis of the ocular optical system, are located in a light path extending from said objective optical system to an image forming position at which an image is formed by the objective optical system.

10. The camera according to claim 5, wherein a lens of the objective optical system and a lens of the ocular optical system which are externally exposed on the camera body, each comprise a rectangular shape defining minor sides and major sides with respect to the vertical direction and the horizontal direction of the camera, respectively.

11. A camera including a photographing optical system having a rectangular photographic field frame having major and minor sides, and a real-image finder optical system for viewing said photographic field frame; said real-image finder optical system comprising:

an objective optical system having a positive power;

an ocular optical system having a positive power; and an erecting optical system having four reflection surfaces;

wherein at least two optical axes, out of three optical axes which are connected to each other via said four reflection surfaces, are inclined with respect to said major and minor sides of said rectangular photographic field frame.

12. The camera according to claim 11, wherein a vertical distance from a point of intersection between a reflection surface provided closest to the object side of said real-image finder optical system and an incident optical axis of said objective optical system, and a point of intersection between a reflection surface closest to an outermost eyepiece lens of said ocular optical system and a light-emitting optical axis of said ocular optical system, is shorter compared to a case where said at least two optical axes are not inclined with respect to said major and minor sides.

13. The camera according claim 12, wherein said incident optical axis which is incident on said reflection surface provided closest to the object side of said real-image e finder optical system, and said light-emitting optical axis which emits from said reflection surface closest to an outermost eyepiece lens of said ocular optical system, each extend parallel to the optical axis of said photographing optical system.

* * * * *